United States Patent
Nakayama

[11] Patent Number: 6,163,351
[45] Date of Patent: Dec. 19, 2000

[54] BACKLIGHT FOR LIQUID CRYSTAL DISPLAY APPARATUS AND LIQUID CRYSTAL DISPLAY APPARATUS INCORPORATING THE SAME

[75] Inventor: Mitsuo Nakayama, Tochigi-ken, Japan

[73] Assignee: Sharp Kabushiki Kaisha, Osaka, Japan

[21] Appl. No.: 09/327,566

[22] Filed: Jun. 8, 1999

[30] Foreign Application Priority Data

Jun. 8, 1998 [JP] Japan ................... 10-159759

[51] Int. Cl.[7] .............................................. G02F 1/1325
[52] U.S. Cl. .......................... 349/61; 349/65; 349/115; 349/9
[58] Field of Search .................... 349/9, 61, 65, 349/96, 115

[56] References Cited

U.S. PATENT DOCUMENTS

| | | | |
|---|---|---|---|
| 4,268,127 | 5/1981 | Oshima et al. | 349/96 |
| 5,262,928 | 11/1993 | Kashima et al. | 349/65 |
| 5,557,343 | 9/1996 | Yamagishi | 348/781 |
| 5,712,694 | 1/1998 | Taira et al. | 349/9 |
| 5,764,322 | 6/1998 | Mamiya et al. | 349/65 |
| 5,828,488 | 10/1998 | Ouderkirk et al. | 349/96 |
| 5,899,551 | 5/1999 | Neijzen et al. | 349/115 |
| 6,008,871 | 12/1999 | Okumura . | |

FOREIGN PATENT DOCUMENTS

| | | |
|---|---|---|
| 5-80328 | 4/1993 | Japan . |
| 6-160840 | 6/1994 | Japan . |
| 9-506984 | 7/1997 | Japan . |
| 9-506985 | 7/1997 | Japan . |
| WO 95/17692 | 6/1995 | WIPO . |
| WO 95/17699 | 6/1995 | WIPO . |

*Primary Examiner*—James A. Dudek
*Attorney, Agent, or Firm*—Nixon & Vanderhye P.C.

[57] ABSTRACT

A backlight for a liquid crystal display apparatus of the present invention includes a light guide plate having a first side, a second side, and an end face, and a rod-like light source provided at the end face of the light guide plate, where light emitted from the light source enters the light guide plate through the end face, exits the light guide plate through the first side perpendicular to the end face, The backlight further comprise a polarization reflection film provided at the end face of the light guide plate.

7 Claims, 6 Drawing Sheets

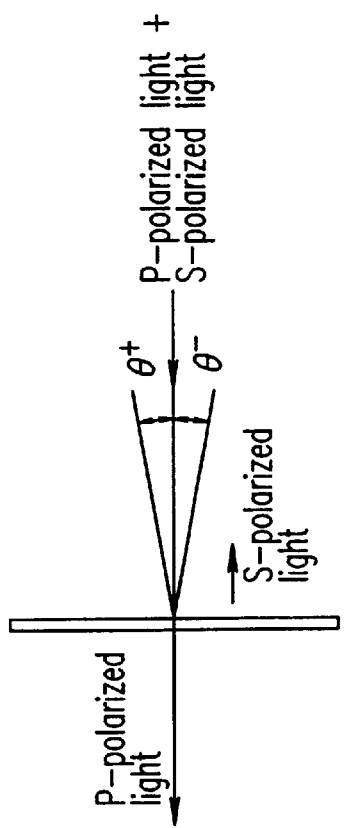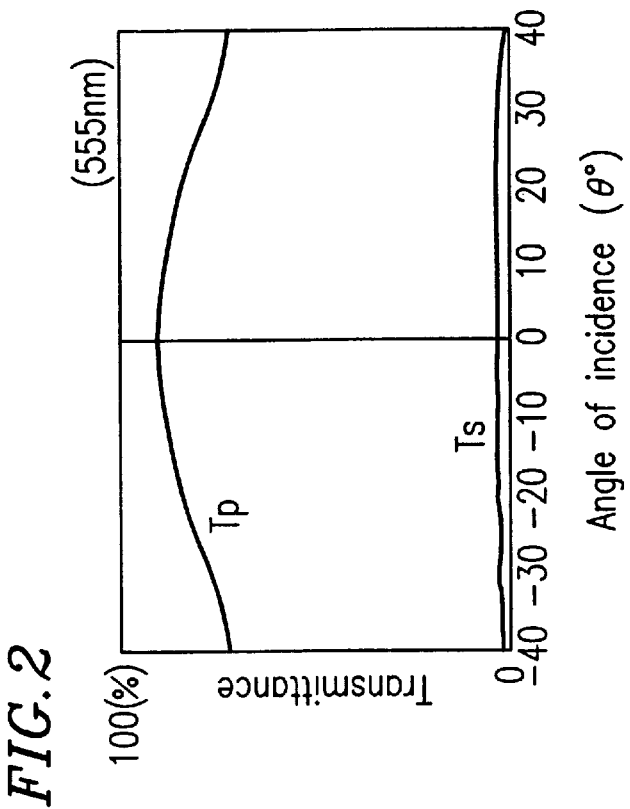
FIG.2

BACKLIGHT FOR LIQUID CRYSTAL DISPLAY APPARATUS AND LIQUID CRYSTAL DISPLAY APPARATUS INCORPORATING THE SAME

BACKGROUND OF THE INVENTION

1. Field of the Invention

The present invention relates to a liquid crystal display apparatus for displaying images by modulating a polarization state of linearly-polarized light, such as a liquid crystal television, a liquid crystal display for computers, and a PALC (Plasma Addressed Liquid Crystal) display, and a backlight for use therein.

2. Description of the Related Art

Recently, liquid crystal display apparatuses, more particularly those incorporating color display elements, have been remarkably improved, and their market has been steadily growing because they can save the installation space by virtue of the small thickness and can also save power.

The liquid crystal display apparatus comprises an element (liquid crystal panel) including a liquid crystal layer interposed between a pair of glass substrates, and polarizing plates which are attached on opposite sides of the element (the front and rear sides; light passes through the panel from the rear side to the front side). The polarization state of linearly-polarized light incident upon a liquid crystal panel is modulated by the liquid crystal layer, thereby displaying images.

A transmission-type liquid crystal display apparatus, which is currently dominating among others, requires illumination from the rear thereof. Therefore, a backlight is an essential device to the transmission-type liquid crystal display apparatus.

A conventional backlight emits randomly-polarized light having non-uniform polarization directions. Approximately half of the incident light is absorbed by a polarizing plate on the rear side of the liquid crystal panel, which poses a problem that the light efficiency is thus reduced and it is not possible to achieve high brightness. In mobile personal computers which are basically driven by batteries and PALCs which are expected to be provided in large sizes, i.e., from 40 to 60 inches, reduction of power consumed by the backlight has had a high priority and it has thus been difficult to attain high brightness. Moreover, light absorbed by the polarizing plate on the rear side is converted to heat, increasing the temperature of the liquid crystal display apparatus and thus reducing the reliability thereof.

In order to solve the above-described problems, a liquid crystal display apparatus having a configuration as shown in FIG. 4 has been recently adopted, whose brightness can be increased with polarization-based techniques.

In such a liquid crystal display apparatus, a fluorescent lamp 4, or a light source, is provided at an end of a light guide plate 7, and a polarization reflection film 21 is provided between a diffusing plate 11 and a liquid crystal panel 3. Random light emitted from the light source 4 enters the light guide plate 7, and is reflected off a reflection pattern 12 formed on the lower side of the light guide plate 7. A portion of the reflected light which is polarized in the direction of a transmission axis of the polarization reflection film 21 (indicated by a dashed line in FIG. 4) is transmitted through the polarization reflection film 21 and reaches the liquid crystal panel 3 substantially as it is. Another portion of the reflected light which is polarized in the direction orthogonal to the transmission axis of the polarization reflection film 21 (i.e., along the reflection axis thereof) (indicated by a solid line in FIG. 4) is reflected off the polarization reflection film 21, and returns toward the lower side of the light guide plate 7. The light traveling toward the lower side of the light guide plate 7 has its polarization direction rotated while passing through the diffusing plate 11 or while being reflected again off the reflection pattern 12 on the lower side of the light guide plate 7. Because of this rotation effect, a portion of the return light now has a polarization direction such that it can pass through the polarization reflection film 21. The remaining portion of the return light is again reflected off the polarization reflection film 21 and returns toward the lower side of the light guide plate 7 to have its polarization direction rotated again. As a result of this repeated process, the polarization direction of light reaching the liquid crystal panel 3 can be aligned with the transmission axis of the polarization reflection film 21. If the transmission axis of the polarization reflection film 21 is aligned with the transmission axis of the polarizing plate 3a provided on the rear side of the liquid crystal panel 3, the light efficiency can be improved. Theoretically, the light efficiency can be improved by a factor of about 2, but empirically the factor is around 1.6.

According to the above-described liquid crystal display apparatus, the backlight efficiency can be improved. In the present state of the art, however, a polarization reflection film is difficult to mass-produce and thus is very expensive, which poses a problem that it is difficult to adopt the film for PALCs which are expected to be provided in large sizes, i.e., from 40 to 60 inches.

A PBS (Polarization Beam Splitter) has a similar function as that of the polarization reflection film. Japanese Laid-Open Publication No. 6-160840 discloses a liquid crystal display apparatus including the PBS as shown in FIG. 5.

In the liquid crystal display, a PBS 9 is provided between a light source 4 and an end face of a light guide plate 7. The PBS 9 splits random light from the light source 4 into two light waves with different polarization directions (P-polarized light and S-polarized light) before the light enters the light guide plate 7. One of the light waves (e.g., P-polarized light, as indicated by dashed lines in FIG. 5) enters the Light guide plate 7. The polarization direction of the other one of the light waves (e.g., S-polarized light, as indicated by solid lines in FIG. 5) is changed and the light wave is converted into P-polarized light through a ½ phase plate 10 which is provided at an end face of the light guide plate 7.

The PBS can split incident light into P-polarized light and S-polarized light only for angles of incidence from about −10° to about +20°. Due to the narrow angle range, the PBS is not suitable for splitting light from a diffused light source.

SUMMARY OF THE INVENTION

According to one aspect of this invention, a backlight for a liquid crystal display apparatus includes: a light guide plate having a first side, a second side, and an end face; and a rod-like light source provided at the end face of the light guide plate. Light emitted from the light source enters the light guide plate through the end face, exits the light guide plate through the first side perpendicular to the end face. The backlight further includes a polarization reflection film provided at the end face of the light guide plate.

In one embodiment of the invention, the polarization reflection film is attached to the light guide plate with an adhesive having a refractive index which is close to refractive indexes of the light guide plate and the polarization reflection film.

In one embodiment of the invention, a reflecting plate including a mirror surface is provided at the second side of the light guide plate opposite to the first side.

In one embodiment of the invention, a reflecting member including a diffuse reflection surface is provided around the light source so that light which is emitted from the light source in directions opposite to the light guide plate, and light which does not enter the light guide plate and is reflected therefrom, are reflected back toward the light guide plate.

In one embodiment of the invention, a polarization direction of light in the light guide plate is parallel to the first side and the second side of the light guide plate.

In one embodiment of the invention, a collimator is provided at the first side of the light guide plate.

In one embodiment of the invention, a diffusing plate with an extremely low diffusing capability which does not disturb polarization of light, is provided at the first side of the light guide plate.

According to another aspect of the invention, a liquid crystal display apparatus includes: a liquid crystal panel; and a backlight for a liquid crystal display apparatus provided at a rear side of the liquid crystal panel, the backlight including: a light guide plate having a first side, and an end face: and a rod-like light source provided at the end face of the light guide plate. Light emitted from the light source enters the light guide plate through the end face, exits the light guide plate through the first side perpendicular to the end face. The backlight further includes a polarization reflection film provided at the end face of the light guide plate.

Hereinafter, functions of the present invention will be described.

The polarization reflection film provided at an end face of the light guide plate in the present invention has a high polarization splitting capability as will be described later with reference to FIG. 2. Therefore, the polarization reflection film can efficiently split random light emitted from the light source into two light waves with different polarization directions (P-polarized light and S-polarized light). Only one of the two light waves, which can be effectively used in the liquid crystal display apparatus, efficiently enters the light guide plate and is output toward the liquid crystal panel. Although it is not the most accurate way in a strict sense to describe the light waves split by a polarization reflection film as "P-polarized light" and "S-polarized light", for illustration purposes, the term "P-polarized light" as used herein refers to light having a polarization direction along the transmission axis of the film, and the term "S-polarized light" as used herein refers to light having a polarization direction along the reflection axis thereof.

Furthermore, as can be seen from FIGS. 2 and 6, a polarization reflection film has a wider range of angles of incidence than that of a PBS, and thus can improve the light efficiency for diffused light such as light of a fluorescent lamp that has a wide angle of incidence. Moreover, according to the present invention, the polarization reflection film is provided at an end face of the light guide plate, thereby eliminating the need to provide a polarization reflection film of a large size as used in the conventional liquid crystal display apparatus.

Furthermore, according to the present invention, the light guide plate and the polarization reflection film are adhered together by an adhesive having a refractive index which is close to the reflective indexes of the light guide plate and the polarization reflection film. Thus, it is possible to reduce reflection loss incurred at the end face of the light guide plate and the surface of the polarization reflection film due to a difference between the refractive indexes of the respective materials.

A reflecting plate may be provided at a side ("second side") of the light guide plate opposite to the other side ("first side"; light is output from this side) of the light guide plate, whereby light traveling toward the lower side of the light guide plate can be reflected toward the first side of the light guide plate. The reflecting plate preferably comprises a mirror surface, so that the polarization direction of light reflected by the reflecting plate is kept unchanged.

A reflecting member may be provided around the light source, whereby light which is not emitted toward the light guide plate, and light which does not enter the light guide plate by being reflected off the end face of the light guide plate or the polarization reflection film, are reflected by the member toward the light guide plate, not wasted. By using a reflecting member which comprises a diffuse reflection surface, the polarization direction of return light from the polarization reflection film can be rotated so as to obtain a component which can pass through the polarization reflection film. Therefore, light efficiency is further improved.

The polarization direction of light within the light guide plate is parallel to the reflection surfaces (the first and second sides) of the light guide plate (i.e., the light is S-polarized light with respect to the surfaces), whereby the reflectance at the upper and lower reflection surfaces of the light guide plate can be increased. The reflectance at a reflection surface of a collimator (which is described in more detail below) can be also increased, thereby further improving the light efficiency.

The collimator such as a collimating lens is provided at the first side of the light guide plate, whereby light exiting the light guide plate can be collimated to the liquid crystal panel. In order to illuminate the liquid crystal panel with the exiting light while keeping the polarization direction thereof unchanged, no diffusing plate, or a diffusing plate with an extremely low diffusing capability which does not disturb polarization, is preferably provided at the first side of the light guide plate.

Thus, the invention disclosed herein makes possible the advantages of: (1) providing a backlight for a liquid crystal display apparatus in which the light efficiency, and thus the brightness of the display, is improved, and the heat generation in the liquid crystal display apparatus is suppressed to improve the reliability of the apparatus; and (2) providing a liquid crystal display apparatus incorporating the same.

These and other advantages of the present invention will become apparent to those skilled in the art upon reading and understanding the following detailed description with reference to the accompanying figures.

BRIEF DESCRIPTION OF THE DRAWINGS

FIG. 2 illustrates polarization split characteristics of a polarization reflection film used in the present invention.

DESCRIPTION OF THE PREFERRED EMBODIMENTS

Hereinafter an example of the present invention will be described with reference to the accompanying drawings.

Figure 1:
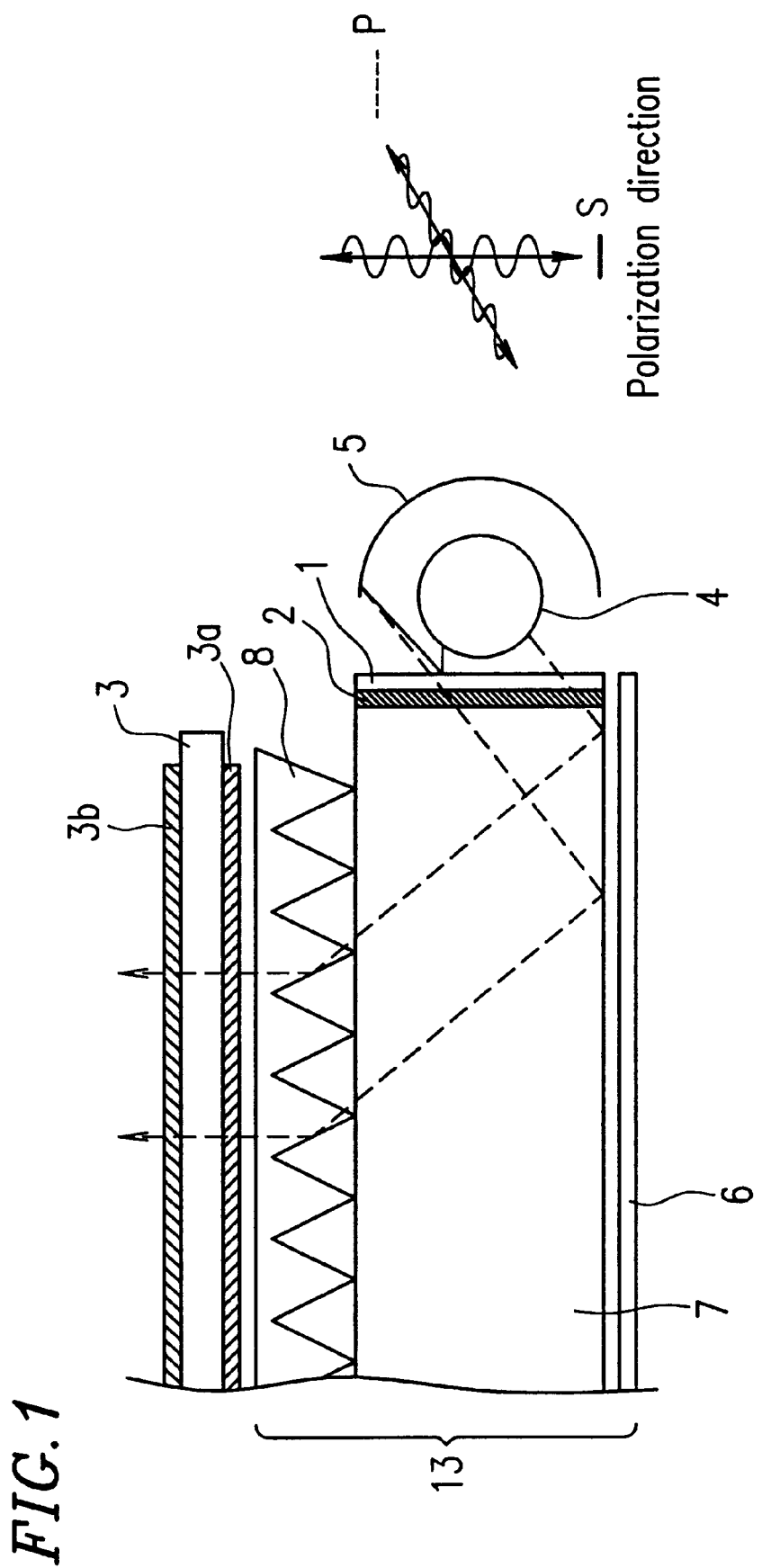
FIG. 1 illustrates a cross-sectional view of a liquid crystal display apparatus according to an example of the present invention.

FIG. 1 is a cross-sectional view illustrating a liquid crystal display apparatus according to the example of the present invention.

The liquid crystal display apparatus comprises a liquid crystal panel 3 including a Liquid crystal layer interposed between a pair of glass substrates. A polarizing plate 3a is provided on the lower side of the liquid crystal panel 3 while another polarizing plate 3b is provided on the upper side of the liquid crystal panel 3. Light passes through the liquid crystal panels 3 from the lower side to the upper side. The polarization state of linearly-polarized light incident upon the liquid crystal panel 3 is modulated by the liquid crystal layer, thereby displaying images. Below the liquid crystal panel 3, a backlight 13 is provided for emitting light to the liquid crystal panel 3.

The backlight 13 includes a fluorescent lamp 4 provided at an end face of the transparent light guide plate 7. A reflection mirror 5 comprising a diffuse reflection surface is provided so as to surround the fluorescent lamp 4 at the side opposite to the light guide plate 7. A polarization reflection film 1 is provided on the end face of the light guide plate 7 adjacent to the fluorescent lamp 4. A reflecting plate 6 comprising a mirror surface is provided at the lower side of the light guide plate 7. A collimating lens 8 is provided at the upper side of the light guide plate 7.

In the backlight 13, light emitted from the fluorescent lamp 4 is incident upon the polarization reflection film 1, directly or after being reflected off the reflection mirror 5. Light (indicated by a dashed line) having a polarization direction parallel to the reflection surfaces (the upper and lower surfaces) of the light guide plate 7 passes through the polarization reflection film 1 and enters the light guide plate 7. Light (indicated by a solid line) having a polarization direction perpendicular to the reflection surfaces (the upper and lower surfaces) of the light guide plate 7 is reflected off the polarization reflection film 1 and returns to the fluorescent lamp 4 or the reflecting mirror 5.

The fluorescent lamp 4 is coated with a phosphor and the reflection mirror 5 is coated with a diffuse reflection material. Therefore, some components of the return light are rotated and become those capable of passing through the polarization reflection film 1 to enter the light guide plate 7. Again, light which does not pass through the polarization reflection film 1 returns to the fluorescent lamp 4 or the reflection mirror 5. The repetition of this process can improve the light efficiency.

Due to the difference between the refractive indexes of the respective materials, there is a reflection loss of about 5% in reflectance at the surface of the polarization reflection film 1 (refractive index: about 1.6), and a reflection loss of about 4% in reflectance at the surface of the light guide plate 7 (refractive index: about 1.5). If the polarization reflection film 1 and the light guide plate 7 are attached together with an adhesive 2 having a refractive index (possibly about 1.5 to about 1.6) which is close to both of the refractive indexes of the polarization reflection film 1 and the light guide plate 7, a large portion of the reflection loss, i.e., 4%+5%=9%, is eliminated.

In addition, if a reflection preventing function 1a is provided at a side (closer to the lamp 4) of the polarization reflection film 1, a large portion of the reflection loss (about 5%) is eliminated.

FIG. 2 illustrates polarization split characteristics of an exemplary polarization reflection film "D-BEF" (manufactured by Sumitomo 3M). In particular, FIG. 2 shows a relationship between the transmittances of P-polarized light and S-polarized light (indicated by Tp and Ts, respectively) and the angle at which the wave is incident upon the polarization reflection film. In this figure, a higher transmittance for P-polarized light and a lower transmittance for S-polarized light (a higher reflectance for S-polarized light) indicate a higher efficiency in splitting light into P-polarized light and S-polarized light. When the polarization direction of P-polarized light is aligned with the light transmission axis of the polarizing plate 3a on the lower side of the liquid crystal panel 3, P-polarized light can be used as effective light. On the other hand, S-polarized light is reflected off the polarization reflection film 1 and returns to the fluorescent lamp 4 or the reflection mirror 5. Then, at least some of the S-polarized light is converted to P-polarized light, and thus is capable of passing through the polarization reflection film 1 so as to be used effectively. The light efficiency is accordingly improved. Furthermore, the film "D-BEF" from Sumitomo 3M has a very high polarization split effect to split light into P-polarized light and S-polarized light over a wide range of angles of incidence. Therefore, D-BEF can be effectively used for diffused light, such as light of a fluorescent lamp, which has a wide range of angles of incidence.

Referring to FIG. 1, light which has entered the light guide plate 7 travels toward the other end face of the light guide plate 7 while being internally reflected via total reflection. The light may also pass through the lower side of the light guide plate 7 so as to be reflected off the reflecting plate 6, and travel toward the upper side of the light guide plate 7.

The reflecting plate 6 preferably comprises a mirror surface so as to preserve the polarization direction of polarized light. The conventional reflecting plate which is patterned with dots of diffusing paint may not be very suitable for this purpose, since it may disturb the polarization direction of a polarized wave.

In this example, the polarization direction of light in the light guide plate 7 is parallel to the reflection surfaces of the light guideplate 7. Thus, the reflectance of the upper and lower reflection surfaces can be increased and further the reflectance of the reflection surface of the collimating lens 8 can be increased, thereby further improving the light efficiency.

Light exiting the light guide plate 7 is collimated by the collimating lens 8 and illuminates the liquid crystal panel 3. In order to illuminate the liquid crystal panel 3 while keeping the polarization direction of the light unchanged, preferably no diffusing plate is provided at the upper side of the light guide plate 7. Alternatively, a diffusing plate with an extremely low diffusing capability which does not disturb polarization may be used.

As described above, the polarized light which has a polarization direction aligned with the transmission axis of the polarizing plate 3a is incident upon the polarizing plate 3a and thus enters the liquid crystal panel 3. Therefore, substantially no light is absorbed by the polarizing plate 3a, thereby reducing the amount of heat generation.

Figure 3:
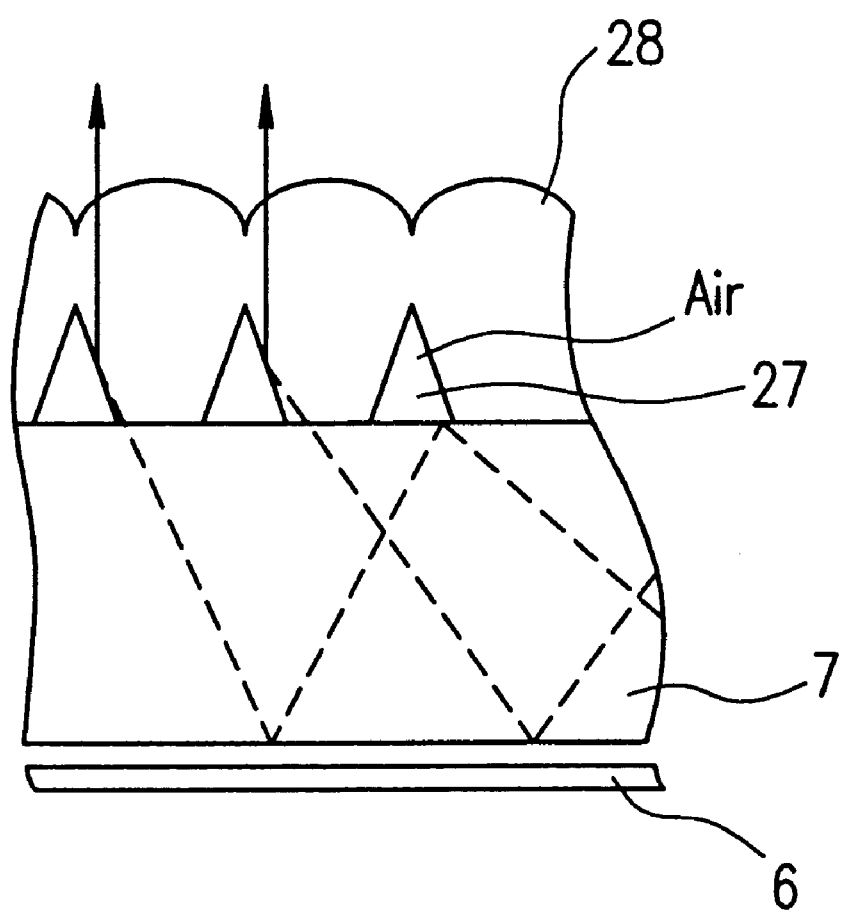
FIG. 3 illustrates a cross-sectional view of a backlight for a liquid crystal display apparatus according to another example of the present invention.
Figure 4:
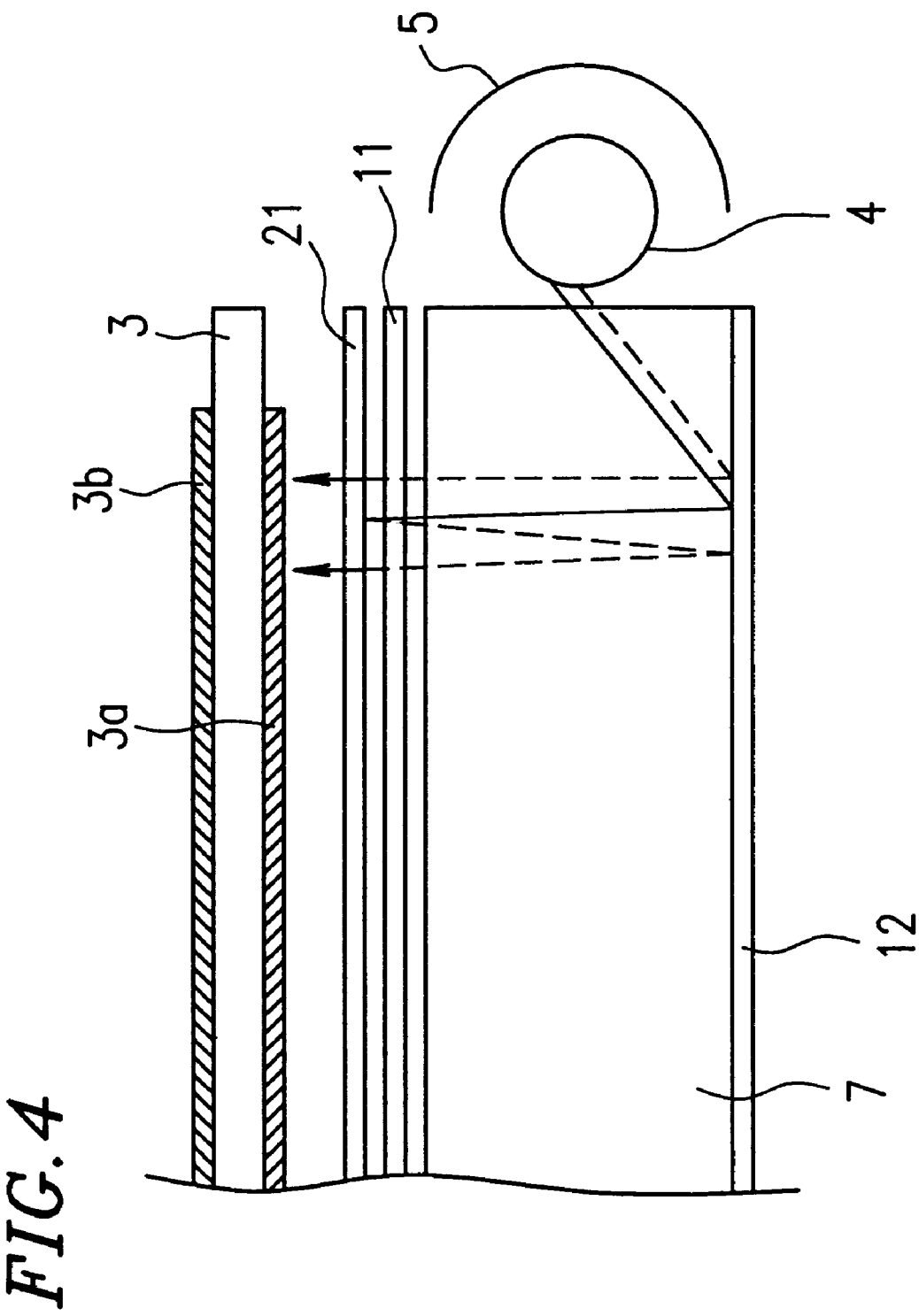
FIG. 4 illustrates a cross-sectional view of a conventional liquid crystal display apparatus.
Figure 5:
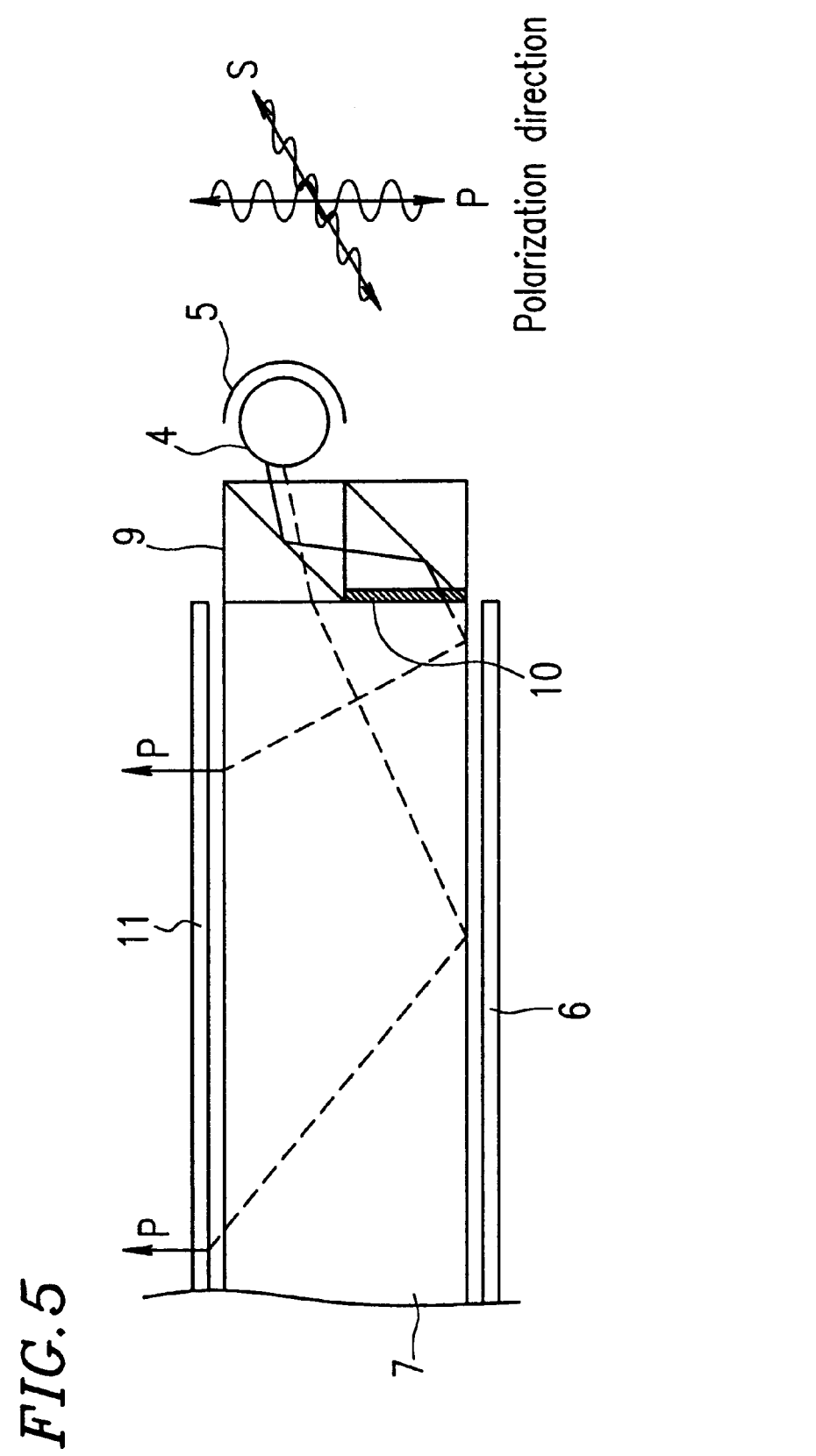
FIG. 5 illustrates a cross-sectional view of a conventional liquid crystal display apparatus.
Figure 6:
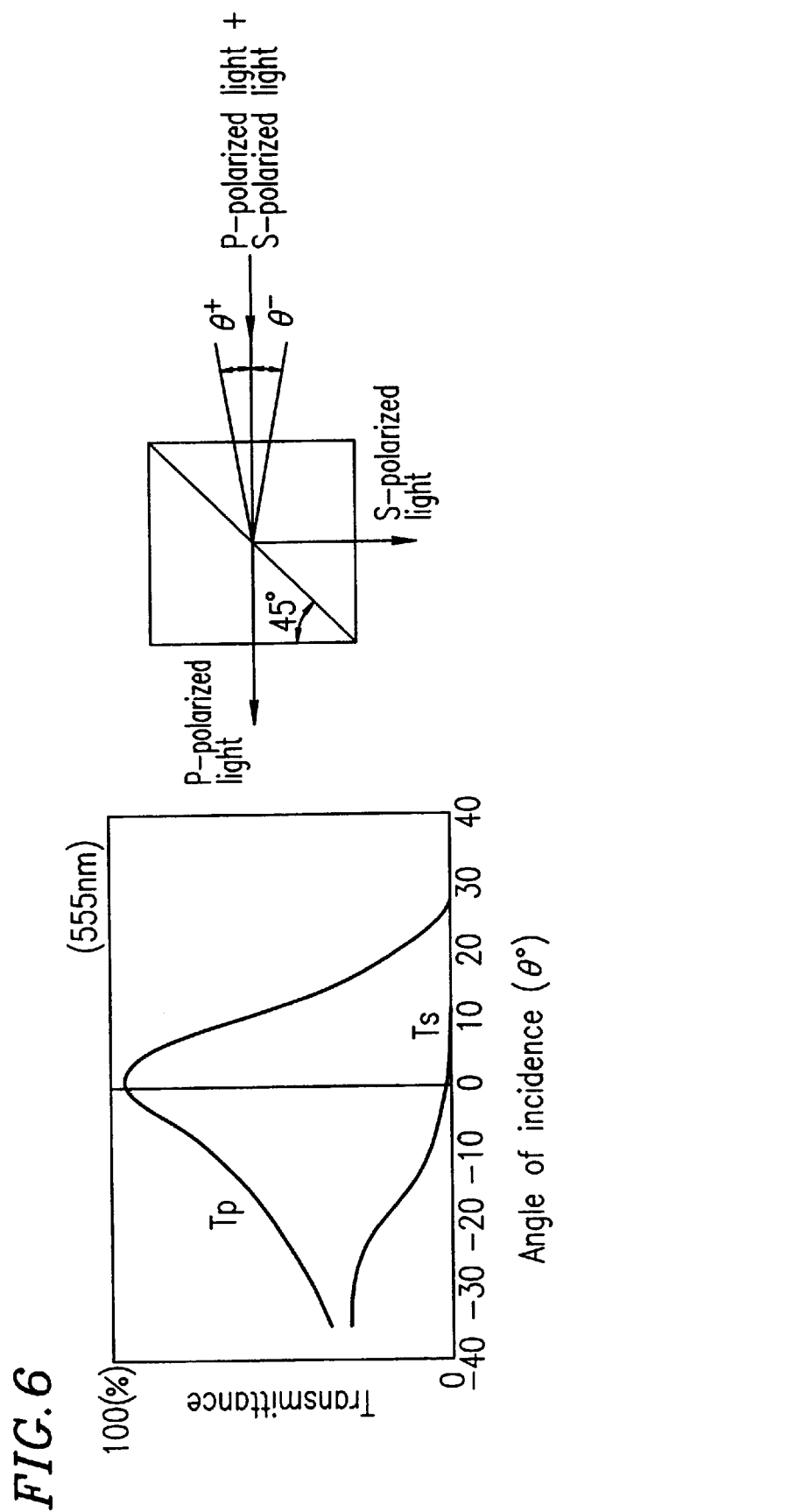
FIG. 6 illustrates polarization split characteristics of a polarization beam splitter.

In the above example, as shown in FIG. 1, a triangular prism is used as the collimating lens 8. Alternatively, the collimating lens 8 may be configured of a plurality of triangular spaces 27 and an array of lenses 28 as shown in FIG. 3 may be used.

Furthermore, in the above example, a side-edge type backlight is described where the backlight includes the light guide plate 7 which is made of an acrylic material or the like. Alternatively, the present invention can be used with an air-filled hollow side-edge type backlight.

As described above, the polarization reflection film provided at an end face of the light guide plate has a high polarization splitting capability. Therefore, the polarization reflection film can efficiently split random light emitted from the light source into two light waves with different polarization directions. Only one of the two light waves, which can be effectively used in the liquid crystal display apparatus, efficiently enters the light guide plate. The polarization reflection film has a wide range of angles of incidence, and thus can improve the light efficiency for diffused light such as light of a fluorescent lamp that has a wide angle of incidence. Moreover, since it is not necessary to provide a polarization reflection film of a large size as used in the conventional liquid crystal display apparatus, it is possible to reduce a price of a liquid crystal display apparatus and to incorporate the backlight of this invention into a liquid crystal display apparatus which is expected to be provided in a large size.

The light guide plate and the polarization reflection film are adhered together by an adhesive having a refractive index which is close to the reflective indexes of the light guide plate and the polarization reflection film. Thus, it is possible to reduce reflection loss incurred at the end face of the light guide plate and the surface of the polarization reflection film, thereby further increasing light efficiency.

The reflecting plate is provided at a side of the light guide plate opposite to the other side of the light guide plate, thereby further increasing light efficiency. The reflecting plate preferably comprises a mirror surface, so that the polarization direction of light reflected by the reflecting plate is kept unchanged, whereby the light guide plate outputs only light to be effectively used for the liquid crystal panel.

The reflecting member is provided around the light source, so that light which is not emitted toward the light guide plate, and light which does not enter the light guide plate by being reflected off the end face of the light guide plate or the polarization reflection film, are reflected by the member toward the light guide plate, thereby further increasing light efficiency. By using a diffuse reflection surface as a reflecting member, the polarization direction of return light from the polarization reflection film can be rotated so as to obtain a component which can pass through the polarization reflection film. Therefore, light efficiency is further improved.

The polarization direction of light within the light guide plate is parallel to the reflection surfaces of the light guide plate, whereby the reflectance at the upper and lower reflection surfaces of the light guide plate can be increased. The reflectance at a reflection surface of the collimator can be also increased. Therefore, light efficiency is further improved.

The collimator such as a collimating lens is provided at the upper side of the light guide plate, whereby light exiting the light guide plate can be collimated to the liquid crystal panel. By providing no diffusing plate, or a diffusing plate with an extremely low diffusing capability which does not disturb polarization, at the upper side of the light guide plate, the liquid crystal panel is illuminated with the exiting light while keeping the polarization direction thereof unchanged, whereby the light guide plate outputs only light to be effectively used for the liquid crystal panel.

A liquid crystal display apparatus according to this invention includes the backlight of this invention having such superior features, whereby light efficiency can be increased so that high brightness is achieved. Moreover, mobile personal computers requiring low power consumption and large PALCs measuring from 40 to 60 inches can be realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A backlight for a liquid crystal display apparatus, comprising:

a light guide plate having a first side, a second side, and an end face;

a rod-like light source provided at the end face of the light guide plate;

a polarization reflection film provided at the end face of the light guide plate;

wherein light emitted from the light source enters the light guide plate through the end face, and exits the light guide plate through the first side perpendicular to the end face; and wherein the polarization reflection film is attached to the light guide plate with an adhesive having a refractive index which is close to refractive indices of the light guide plate and the polarization reflection film, respectively.

2. A backlight for a liquid crystal display apparatus according to claim 1, wherein a reflecting plate comprising a mirror surface is provided at the second side of the light guide plate opposite to the first side.

3. A backlight for a liquid crystal display apparatus according to claim 1, wherein a reflecting member comprising a diffuse reflection surface is provided around the light source so that light which is emitted from the light source in directions opposite to the light guide plate, and light which does not enter the light guide plate and is reflected therefrom, are reflected back toward the light guide plate.

4. A backlight for a liquid crystal display apparatus according to claim 1, wherein a polarization direction of light in the light guide plate is parallel to the first side and the second side of the light guide plate so as to provide increased reflectance off the first side and the second side of the light guide plate.

5. A backlight for a liquid crystal display apparatus according to claim 1, wherein a collimator is provided at the first side of the light guide plate.

6. A backlight for a liquid crystal display apparatus according to claim 1, wherein a diffusing plate with an extremely low diffusing capability which does not disturb polarization of light, is provided at the first side of the light guide plate.

7. A liquid crystal display apparatus, comprising:

a liquid crystal panel;

a backlight for a light crystal display apparatus provided at a rear side of the liquid crystal panel, the backlight comprising:

a light guide plate having a first side, and an end face;

a rod-like light source provided at the end face of the light guide plate;

a polarization reflection film provided at the end face of the light guide plate;

wherein light emitted from the light source enters the light guide plate through the end face and exits the light guide plate through the first side perpendicular to the end face; and the polarization reflection film is attached to the light guide plate with an adhesive having a refractive index which is close to refractive indices of the light guide plate and the polarization reflection film, respectively.

* * * * *